(12) United States Patent
Baba et al.

(10) Patent No.: US 9,470,509 B2
(45) Date of Patent: Oct. 18, 2016

(54) INNER DIAMETER MEASURING DEVICE AND INNER DIAMETER MEASURING METHOD

(71) Applicant: IHI Corporation, Koto-ku, Tokyo (JP)

(72) Inventors: Michiko Baba, Tokyo (JP); Kouzou Hasegawa, Tokyo (JP); Norimasa Taga, Tokyo (JP)

(73) Assignee: IHI Corporation, Tokyo (JP)

( * ) Notice: Subject to any disclaimer, the term of this patent is extended or adjusted under 35 U.S.C. 154(b) by 171 days.

(21) Appl. No.: 14/377,230

(22) PCT Filed: Feb. 7, 2013

(86) PCT No.: PCT/JP2013/053599
§ 371 (c)(1),
(2) Date: Aug. 7, 2014

(87) PCT Pub. No.: WO2013/118918
PCT Pub. Date: Aug. 15, 2013

(65) Prior Publication Data
US 2015/0131109 A1    May 14, 2015

(30) Foreign Application Priority Data
Feb. 9, 2012 (JP) .................................. 2012-026044

(51) Int. Cl.
*G01B 11/12* (2006.01)
*G01B 11/27* (2006.01)

(52) U.S. Cl.
CPC ............. *G01B 11/12* (2013.01); *G01B 11/272* (2013.01)

(58) Field of Classification Search
None
See application file for complete search history.

(56) References Cited

U.S. PATENT DOCUMENTS

| 1,664,851 A | 4/1928 | Class |
| 1,721,524 A | 7/1929 | Moore |

(Continued)

FOREIGN PATENT DOCUMENTS

| EP | 0076144 A2 | 4/1983 |
| EP | 0373514 A1 | 6/1990 |

(Continued)

OTHER PUBLICATIONS

Final rejection mailed Dec. 29, 2015 in co-pending U.S. Appl. No. 14/377,238.

(Continued)

*Primary Examiner* — Kara E Geisel
*Assistant Examiner* — Amanda Merlino
(74) *Attorney, Agent, or Firm* — Nields, Lemack & Frame, LLC

(57) ABSTRACT

An inner diameter measuring device, comprising a measurement carriage traveled in straight direction, pipe holding frames disposed at front and rear positions and for mounting a pipe to be measured, a measuring head supported at a forward end of a supporting member extended in a direction parallel to advancing direction of the measurement carriage, a first and second laser distance measuring unit disposed in traveling distance of the measurement carriage and for performing distance measurement in two directions perpendicularly crossing to each other, wherein the pipe holding frames can adjust a supporting position of the pipe to be measured, the measuring head measures an inner diameter of the pipe to be measured, the first and second laser distance measuring units measure distance with respect to each of the reference outer peripheral surfaces at the parts, and the supporting position of the pipe to be measured is adjusted.

4 Claims, 2 Drawing Sheets

(56) References Cited

U.S. PATENT DOCUMENTS

| | | | |
|---|---|---|---|
| 2,822,620 A | 2/1958 | Ulfeldt | |
| 3,247,732 A | 4/1966 | Barnhart | |
| 3,436,967 A | 4/1969 | Post | |
| 3,771,350 A | 11/1973 | Romans | |
| 4,045,877 A | 9/1977 | Rutter | |
| 4,382,338 A | 5/1983 | Possati et al. | |
| 4,536,963 A | 8/1985 | Yamamoto et al. | |
| 4,631,834 A | 12/1986 | Hayashi et al. | |
| 4,872,269 A | 10/1989 | Sattmann | |
| 4,899,277 A | 2/1990 | Iizuka et al. | |
| 4,934,813 A | 6/1990 | Yaginuma et al. | |
| 4,937,524 A | 6/1990 | Fasnacht et al. | |
| 4,967,092 A | 10/1990 | Fraignier et al. | |
| 5,083,384 A | 1/1992 | Possati et al. | |
| 5,095,634 A | 3/1992 | Overlach et al. | |
| 5,224,274 A | 7/1993 | Blaiklock | |
| 5,259,119 A | 11/1993 | Yoshioka et al. | |
| 5,808,250 A | 9/1998 | Torii et al. | |
| 5,933,231 A | 8/1999 | Bieman et al. | |
| 6,243,962 B1 | 6/2001 | Brock | |
| 6,249,007 B1 * | 6/2001 | Gooch | G01B 11/026 250/559.29 |
| 6,427,353 B1 | 8/2002 | Nelson et al. | |
| 6,931,149 B2 | 8/2005 | Hagene et al. | |
| 3,033,032 A1 | 1/2010 | Fujikawa et al. | |
| 8,841,603 B1 | 9/2014 | Blanton et al. | |
| 8,842,297 B2 | 9/2014 | Størksen et al. | |
| 9,145,924 B2 | 9/2015 | Baba et al. | |
| 9,372,061 B2 | 6/2016 | Baba et al. | |
| 9,372,073 B2 | 6/2016 | Baba et al. | |
| 2003/0198374 A1 | 10/2003 | Hagene et al. | |
| 2004/0114793 A1 | 6/2004 | Bondurant | |
| 2006/0044089 A1 | 3/2006 | Kang et al. | |
| 2006/0112577 A1 | 6/2006 | Jones | |
| 2006/0283037 A1 | 12/2006 | Galle | |
| 2008/0105067 A1 | 5/2008 | Frey | |
| 2009/0144999 A1 | 6/2009 | Lau | |
| 2010/0005676 A1 | 1/2010 | Fujikawa et al. | |
| 2010/0060904 A1 | 3/2010 | Keightley et al. | |
| 2010/0110448 A1 | 5/2010 | Johnson et al. | |
| 2011/0080588 A1 | 4/2011 | Segall | |
| 2015/0000465 A1 | 1/2015 | Baba et al. | |
| 2015/0002836 A1 | 1/2015 | Baba et al. | |
| 2015/0007440 A1 | 1/2015 | Baba et al. | |
| 2015/0009322 A1 | 1/2015 | Baba et al. | |
| 2015/0015695 A1 | 1/2015 | Baba et al. | |
| 2015/0015873 A1 | 1/2015 | Baba et al. | |
| 2015/0020395 A1 | 1/2015 | Baba et al. | |

FOREIGN PATENT DOCUMENTS

| | | | |
|---|---|---|---|
| EP | 1434076 A1 | 6/2004 | |
| FR | 2730304 A1 | 8/1996 | |
| GB | 1388475 A | 3/1975 | |
| JP | 50-159355 A | 12/1975 | |
| JP | 57-22501 A | 2/1982 | |
| JP | 58-66809 A | 4/1983 | |
| JP | 59-187155 A | 10/1984 | |
| JP | 61-144551 A | 7/1986 | |
| JP | 61-282659 A | 12/1986 | |
| JP | 63-55441 A | 3/1988 | |
| JP | 63-159708 A | 7/1988 | |
| JP | 1-195309 A | 8/1989 | |
| JP | 3-502491 A | 6/1991 | |
| JP | 5-62573 A | 3/1993 | |
| JP | 7-55426 A | 3/1995 | |
| JP | 7-29405 U | 6/1995 | |
| JP | 7-191269 A | 7/1995 | |
| JP | 8-14874 A | 1/1996 | |
| JP | 8-93876 A | 4/1996 | |
| JP | 9-311034 A | 12/1997 | |
| JP | 10-137962 A | 5/1998 | |
| JP | 10-197215 A | 7/1998 | |
| JP | 10-213404 A | 8/1998 | |
| JP | 2000-136923 A | 5/2000 | |
| JP | 2000-146564 A | 5/2000 | |
| JP | 2002-22671 A | 1/2002 | |
| JP | 2002-148036 A | 5/2002 | |
| JP | 2003-139525 A | 5/2003 | |
| JP | 2003-329606 A | 11/2003 | |
| JP | 2004-176852 A | 6/2004 | |
| JP | 3105724 U | 11/2004 | |
| JP | 2005-315814 A | 11/2005 | |
| JP | 2005-331333 A | 12/2005 | |
| JP | 2006-153546 A | 6/2006 | |
| JP | 2006-156138 A | 6/2006 | |
| JP | 2006-229551 A | 8/2006 | |
| JP | 2006-234525 A | 9/2006 | |
| JP | 2007-57305 A | 3/2007 | |
| JP | 2007-71852 A | 3/2007 | |
| JP | 2007-248465 A | 9/2007 | |
| JP | 2007-292699 A | 11/2007 | |
| JP | 4230408 B2 | 2/2009 | |
| JP | 2010-164334 A | 7/2010 | |
| JP | 2011-2439 A | 1/2011 | |
| JP | 2011-13060 A | 1/2011 | |
| WO | 97/02480 A1 | 1/1997 | |
| WO | 2007051332 A2 | 5/2007 | |
| WO | 2009152851 A1 | 12/2009 | |

OTHER PUBLICATIONS

Office action mailed Dec. 30, 2015 in co-pending U.S. Appl. No. 14/377,226.
Office action mailed Mar. 22, 2016 in co-pending U.S. Appl. No. 14/377,238.
Notice of Allowance mailed Feb. 16, 2016 in co-pending U.S. Appl. No. 14/377,237.
Notice of Allowance mailed Mar. 1, 2016 in co-pending U.S. Appl. No. 14/377,237.
Notice of Allowance mailed Mar. 30, 2016 in co-pending U.S. Appl. No. 14/377,227.
Office Action mailed Mar. 25, 2015 in co-pending U.S. Appl. No. 14/377,225.
Notice of Allowance mailed Jul. 13, 2015 in co-pending U.S. Appl. No. 14/377,225.
International Search Report and Written Opinion mailed Apr. 23, 2013 in co-pending PCT application No. PCT/JP2013/053589.
International Preliminary Report on Patentability mailed Aug. 21, 2014 in co-pending PCT application No. PCT/JP2013/053589.
International Search Report and Written Opinion mailed Apr. 2, 2013 in co-pending PCT application No. PCT/JP2013/053590.
International Preliminary Report on Patentability mailed Aug. 21, 2014 in co-pending PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in co-pending PCT application No. PCT/JP2013/053592.
International Preliminary Report on Patentability mailed Aug. 21, 2014 in co-pending PCT application No. PCT/JP2013/053592.
International Search Report and Written Opinion mailed Mar. 12, 2013 in corresponding PCT application No. PCT/JP2013/053599.
International Preliminary Report on Patentability mailed Aug. 21, 2014 in corresponding PCT application No. PCT/JP2013/053599.
International Search Report and Written Opinion mailed May 7, 2013 in co-pending PCT application No. PCT/JP2013/053597.
International Preliminary Report on Patentability mailed Aug. 21, 2014 in co-pending PCT application No. PCT/JP2013/053597.
International Search Report and Written Opinion mailed Apr. 16, 2013 in co-pending PCT application No. PCT/JP2013/053598.
International Preliminary Report on Patentability mailed Aug. 21, 2014 in co-pending PCT application No. PCT/JP2013/053598.
International Search Report and Written Opinion mailed Apr. 2, 2013 in co-pending PCT application No. PCT/JP2013/053603.
International Preliminary Report on Patentability mailed Aug. 21, 2014 in co-pending PCT application No. PCT/JP2013/053603.

(56) References Cited

OTHER PUBLICATIONS

European communication dated Sep. 9, 2015 in co-pending European patent application No. 13746779.1.
Office action mailed Sep. 1, 2015 in co-pending U.S. Appl. No. 14/377,238.
European communication dated Sep. 4, 2015 in corresponding European patent application No. 13747139.7.
European communication dated Sep. 18, 2015 in co-pending European patent application No. 13746866.6.
European communication dated Sep. 14, 2015 in co-pending European patent application No. 13746596.9.
European communication dated Oct. 7, 2015 in co-pending European patent application No. 13747245.2.
European communication dated Sep. 9, 2015 in co-pending European patent application No. 13746053.1.
European communication dated Nov. 11, 2015 in co-pending European patent application No. 13746339.4.
European communication dated Oct. 8, 2015 in co-pending European patent application No. 13746993.8.
Office action mailed Dec. 1, 2015 in co-pending U.S. Appl. No. 14/377,227.
Notice of Allowance mailed Jun. 2, 2016 in co-pending U.S. Appl. No. 14/377,238.
Notice of Allowance mailed May 13, 2016 in co-pending U.S. Appl. No. 14/377,226.
Office action mailed Jul. 28, 2016 in co-pending U.S. Appl. No. 14/377,236.

* cited by examiner

INNER DIAMETER MEASURING DEVICE AND INNER DIAMETER MEASURING METHOD

TECHNICAL FIELD

The present invention relates to an inner diameter measuring device and an inner diameter measuring method to perform measurement of inner diameter of a hollow pipe to be measured—in particular, a pipe to be measured with longer length.

BACKGROUND ART

As a device for measuring inner diameter of a hollow member or a hollow shaft, a device is disclosed in the Patent Document 1 is known, for instance.

In the inner diameter measuring device as disclosed in the Patent Document 1, a pipe to be inspected is rotatably supported by a pipe rotating and supporting device, and there is provided a running carriage where a pair of inner diameter measuring units at upper and lower positions are provided and where a pair of inner diameter measuring units can be brought closer to each other or can be separated from each other. By running the running carriage, the inner diameter measuring units are inserted into the pipe to be inspected, and the inner diameter measuring units are separated to upper and lower positions and the inner diameter measuring units are brought into contact with an inner surface of the pipe to be inspected. Further, the pipe to be inspected is rotated by the pipe rotation supporting device, and an inner diameter of the pipe to be inspected is measured.

The inner diameter measuring device as described above is designed in such complicated structure that the pipe rotation supporting device has a driving unit to rotate the pipe, that the running carriage is traveled and that a pair of inner diameter measuring units is moved up and down. Further, there is a problem in that inner diameter of a pipe to be inspected with a length longer in axial direction cannot be measured because the measurement of inner diameter is restricted within such a range as far as the inner diameter measuring unit can be inserted.

Therefore, when a measurement is performed on inner diameter of a pipe to be measured with longer length over total axial length, such structure is required that the inner diameter measuring unit can be inserted from a base end to a forward end into the pipe to be measured. Further, a moving direction must coincide with a center line of the pipe to be measured.

To solve the problems as described above, it is an object of the present invention to provide an inner diameter measuring device, by which to easily align the center line of the pipe to be measured with the moving direction of the inner diameter measuring unit with respect to the pipe to be measured and to measure the inner diameter over the entire axial length of the pipe to be measured.

CONVENTIONAL ART REFERENCE

Patent Document 1: JP-A-2000-136923

DISCLOSURE OF THE INVENTION

The present invention relates to an inner diameter measuring device, comprising a measurement carriage traveled in straight direction, pipe holding frames disposed at front and rear positions with respect to advancing direction of the measurement carriage and for mounting a pipe to be measured, a measuring head supported at a forward end of a supporting member extended in a direction parallel to advancing direction of the measurement carriage, a first laser distance measuring unit and a second laser distance measuring unit disposed in traveling distance of the measurement carriage and for performing distance measurement in two directions perpendicularly crossing to each other, wherein the pipe holding frames can adjust a supporting position of the pipe to be measured as mounted in horizontal direction and in vertical direction, the measuring head measures an inner diameter of the pipe to be measured on condition that the measuring head is inserted in the pipe to be measured, reference outer peripheral surfaces being formed at least at two parts at front and rear positions on the pipe to be measured, the first laser distance measuring unit and the second laser distance measuring unit measure distance with respect to each of the reference outer peripheral surfaces at the two parts, and the supporting position of the pipe to be measured is adjusted by the pipe holding frames so that results of measurement by the first laser distance measuring unit and the second laser distance measuring unit at the two parts become minimum values.

Further, the present invention relates to an inner diameter measuring device, wherein at least one reference ring is provided on the measurement carriage, the reference ring has an outer diameter already known and an inner diameter already known, a positional relation of the reference ring and the measuring head is set so that the measuring head is positioned on a center line of the reference ring, wherein the first laser distance measuring unit and the second laser distance measuring unit measure the outer peripheral surface of the reference ring, and positions of the first laser distance measuring unit and the second laser distance measuring unit are set so that results of distance measurement by the first laser distance measuring unit and by the second laser distance measuring unit become minimum values respectively.

Further, the present invention relates to an inner diameter measuring device, wherein the inner diameter of the reference ring is measured in advance by the measuring head, and the inner diameter of the pipe to be measured as measured by the measuring head is corrected based on the inner diameter of the reference ring as measured.

Further, the present invention relates to an inner diameter measuring method, which is performed by using an inner diameter measuring device which comprise a measurement carriage traveled in straight direction, pipe holding frames disposed at front and rear positions with respect to advancing direction of the measurement carriage and for mounting a pipe to be measured, a measuring head supported at a forward end of a supporting member extended in a direction parallel to advancing direction of the measurement carriage and for measuring an inner diameter of the pipe to be measured, a first laser distance measuring unit and a second laser distance measuring unit disposed in traveling distance of the measurement carriage and for performing distance measurement in two directions perpendicularly crossing each other, comprising a step of mounting the pipe to be measured with reference outer peripheral surfaces being formed at least at two parts at front and rear positions on the pipe holding frame, a step of performing distance measurement with respect to reference outer peripheral surfaces at the two parts by the first laser distance measuring unit and the second laser distance measuring unit, and a step of adjusting a supporting position of the pipe to be measured by the pipe holding frames so that measurement results of the first laser distance measuring unit and the second laser distance measuring unit at the two parts become minimum values.

BRIEF DESCRIPTION OF THE DRAWINGS

FIG. 1A shows a condition where a first reference outer peripheral surface is measured by a laser distance measuring unit, and FIG. 1B shows a condition where a second reference outer peripheral surface is measured.

BEST MODE FOR CARRYING OUT THE INVENTION

Description will be given below on an embodiment of the present invention by referring to the attached drawings.

Figure 1A:
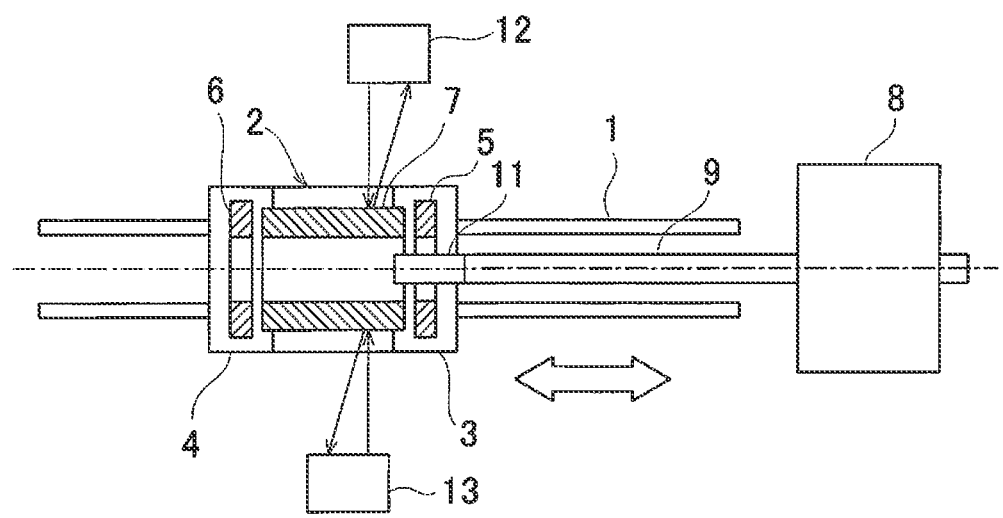
FIG. 1A and FIG. 1B each represent a drawing to show an approximate arrangement of an embodiment of the present invention.
Figure 1B:
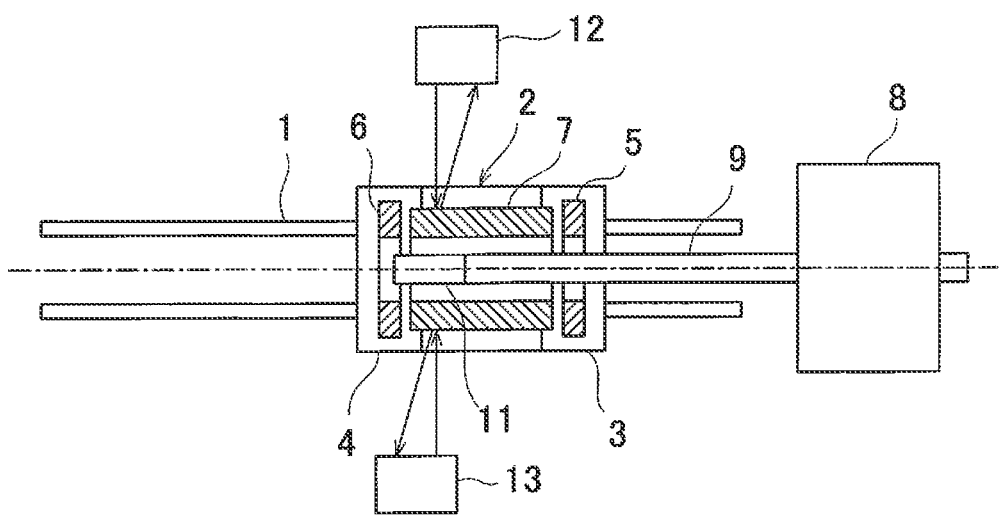

First, referring to FIG. 1A and FIG. 1B, a description will be given on an embodiment of the present invention.

In the following, a description will be given on an inner diameter measuring device in the present embodiment.

On a rail 1 extending in a measuring direction, a measurement carriage 2 is movably provided, and pipe holding frames 3 and 4 are disposed at front and rear positions of the measurement carriage 2 in advancing direction. Each of the pipe holding frames 3 and 4 has a mechanism, which can adjust a supporting position of the pipe to be measured 7 in two directions, i.e. in horizontal and vertical direction under a condition where the pipe to be measured 7 is mounted.

A first reference ring 5 is provided on the pipe holding frame 3 and a second reference ring 6 is provided on the pipe holding frame 4 respectively. Each of the first reference ring 5 and the second reference ring 6 has an outer peripheral surface and an inner peripheral surface prepared with high accuracy, and the outer diameter and the inner diameter have values already known respectively.

Under a condition where the pipe to be measured 7 is mounted to stride over the pipe holding frames 3 and 4 and a position of the pipe to be measured is determined, it is so arranged that a center line of the pipe to be measured coincides with center lines of the first reference ring 5 and the second reference ring 6. At least at two parts of the position, which are separated by a predetermined distance in axial direction of the pipe to be measured 7, reference outer peripheral surfaces (i.e. a first reference outer peripheral surface and a second reference outer peripheral surface) are formed.

In front of the measurement carriage 2, a measuring device main unit 8 is installed. In backward direction from the measuring device main unit 8, a hollow pipe supporting member is extended in parallel to the rail 1 (toward the measurement carriage 2), and a measuring head 11 is supported at a forward end of the supporting member 9. The measuring head 11 has a measuring unit (not shown) for measuring inner diameter of the pipe to be measured 7 under the condition where it is inserted into the pipe to be measured 7. The measuring unit is a contact type measuring head for measuring inner diameter based on displacement of a probe, e.g. by moving the probe in radial direction and by bringing the probe into contact with inner surface of the pipe to be measured 7. Or, the measuring unit is a non-contact type measuring head which projects a laser beam over total circumference, forms an optical ring on inner surface of the pipe to be measured 7, takes an image of the optical ring and measures inner diameter based on a shape of the optical ring on the image.

Each of the measuring head 11 and the supporting member 9 has a cross-sectional external shape in form of a circle, and are smaller than inner diameter of the pipe to be measured 7.

Laser distance measuring units 12 and 13 are disposed at the positions as required in traveling distance of the pipe to be measured 7. The laser distance measuring units 12 and 13 project laser beams and detects a position of the surface to be measured by receiving a reflection light from the surfaces to be measured. The laser distance measuring units 12 and 13 are arranged so that optical axis of the laser distance measuring units 12 and 13 are positioned on a plane perpendicular to the center line of the pipe to be measured 7 and intersect at right angles each other. For example, it is so arranged that the optical axis of the laser distance measuring unit 12 runs in horizontal direction and that the optical axis of the laser distance measuring unit 13 runs in vertical direction. To facilitate explanation, the drawing shows that the laser distance measuring unit 12 is placed at a position to oppose the laser distance measuring unit 13.

For the measurement of inner diameter of the pipe to be measured 7, the measurement carriage 2 is moved forward (i.e. moved toward the measuring device main unit 8), and the measuring head 11 is inserted into the inside of the pipe to be measured 7. Then, the inner diameter of the pipe to be measured is determined. Further, by moving forward the measurement carriage intermittently at a predetermined distance, the inner diameter is measured at each stopping position, and the inner diameter over total length of the pipe to be measured 7 is measured.

When the measuring head 11 is inserted into the inside of the pipe to be measured 7 and measures over total length of the pipe to be measured 7, it is necessary to perform centering between the direction of the rail, the center line of the pipe to be measured 7, the center line of the supporting member 9 and the center line of the measuring head 11. In a case where a traveling in a straight line of the measurement carriage 2 with respect to the rail 1 is guaranteed, either one of the first reference ring 5 or the second reference ring 6 may be omitted.

A measurement result of the measuring head 11 is transmitted to the measuring device main unit 8 and measurement results of the laser distance measuring units 12 and 13 are also transmitted to the measuring device main unit 8. The measuring device main unit 8 calculates absolute value of the inner diameter of the pipe to be measured 7 based on the measurement result of the measuring head 11. A condition of the center line of the pipe to be measured are calculated, i.e. it is determined whether or not the centering has been performed based on the measurement results of the laser distance measuring units 12 and 13.

Figure 2:
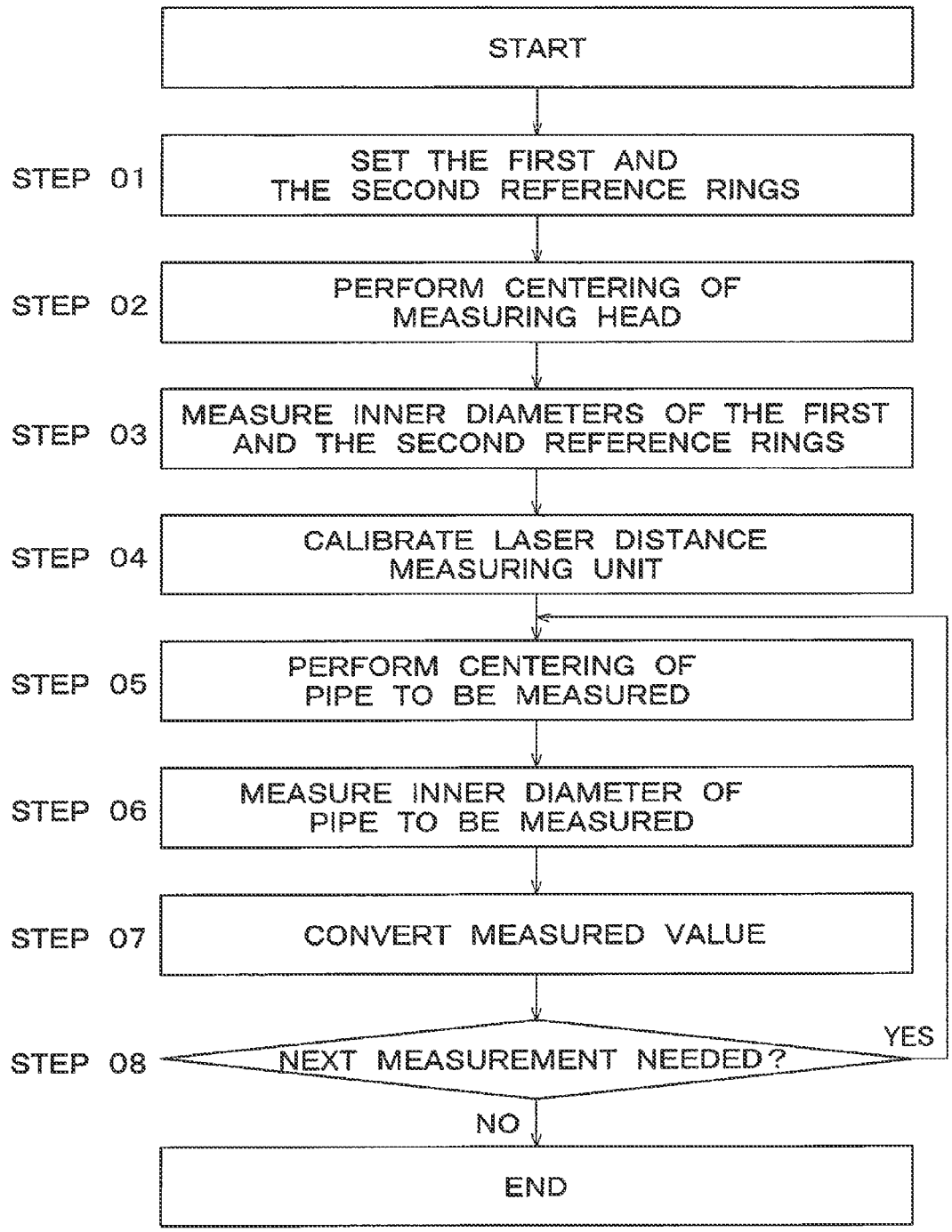
FIG. 2 is flowchart to show an operation of the present invention.

In the following, a description will be given on the centering of the direction of the rail 1, the center line of the pipe to be measured 7, the center line of the supporting member 9 and the center line of the measuring head 11, and on the measurement of inner diameter, by referring to FIG. 2.

First, the running condition of the measurement carriage 2 is adjusted so that the measurement carriage 2 is traveled straightly along the rail 1, and the first reference ring 5 and the second reference ring 6 are set in vertical direction on the measurement carriage 2. Also, the first reference ring 5 and the second reference ring 6 are set up so that the center line of the first reference ring 5 coincides with the center line of the second reference ring 6 and so that these center lines run in parallel to the running direction of the measurement carriage 2 (Step 01).

Next, the measuring head 11 is inserted into the first reference ring 5, and an inner diameter of the first reference ring 5 is measured. Because the inner diameter of the first reference ring 5 is now known, centering of the measuring head 11 and the first reference ring 5 is performed by using the inner diameter of the first reference ring 5 as reference. By performing the centering with the first reference ring 5, the centering of the measuring head 11 is completed (Step 02). Because the position of the measuring head 11 is fixed and the measuring position is also fixed, no accuracy is required for the centering of the center line of the supporting member 9 itself.

When the centering of the measuring head 1 has been completed, inner diameters of the first reference ring 5 and the second reference ring 6 are measured by the measuring head 11, and measurement results are stored (Step 03).

Next, using the first reference ring 5 and the second reference ring 6, a calibration of the laser distance measuring units 12 and 13 is carried out (Step 04).

First, a laser beam from the laser distance measuring unit 12 is projected to outer peripheral surface of the first reference ring 5. While performing the distance measurement, a projecting condition of the laser beam is maintained in horizontal direction and the laser distance measuring unit 12 is displaced in vertical direction. Because the outer peripheral surface is a cylindrical surface, a minimum value of the distance measurement can be obtained. The position of the laser distance measuring unit 12, where this minimum value is obtained, shows a condition that the optical axis of the laser distance measuring unit 12 coincides with a horizontal radius of the first reference ring 5 and the laser distance measuring unit 12 is set at this position.

Similarly, by projecting the laser beam from the laser distance measuring unit 13 to outer peripheral surface of the first reference ring 5, the laser distance measuring unit 13 is installed at a position where a minimum value of the distance measurement can be obtained. Under this condition, the optical axis of the laser distance measuring unit 13 coincides with a vertical radius of the first reference ring 5. Therefore, the optical axis of the laser distance measuring unit 13 and optical axis of the laser distance measuring unit 12 cross each other on the center line of the first reference ring 5. It is to be noted that the calibration of the laser distance measuring units 12 and 13 may be performed by using the second reference ring 6.

When the laser distance measuring units 12 and 13 have been installed, setting on the side of the inner diameter measuring device is completed.

Next, the centering of the pipe to be measured 7 is performed (Step 05).

The pipe to be measured 7 is mounted on the pipe holding frames 3 and 4. Preferably, preliminary adjustment of the mounting position is carried out by using scale or the like and approximate centering of the pipe to be measured 7 is performed.

The measurement carriage 2 is traveled and a positioning of the first reference outer peripheral surface of the pipe to be measured 7 is carried out at measuring position of the laser distance measuring units 12 and 13. While performing distance measurement by the laser distance measuring units 12 and 13, the pipe to be measured 7 is displaced in vertical and horizontal directions by using the pipe holding frame 3 and the pipe to be measured 7 is adjusted at a position where minimum distance measurement values are obtained for each of the laser distance measuring units 12 and 13, and the positioning is completed. A position, where the minimum distance measurement value is obtained is a position, at which a horizontal diameter and a vertical diameter of a first reference outer peripheral surface of the pipe to measured coincide with optical axis of the laser distance measuring units 12 and 13 respectively. This means that the center line of the pipe to be measured 7 at a position on the first reference outer peripheral surface is coincided with the center line of the first reference ring 5.

The measurement carriage 2 is traveled and a positioning of the second outer peripheral surface of the pipe to be measured 7 is carried out at measuring position of the laser distance measuring units 12 and 13. In similar manner, while performing distance measurement with respect to the second reference outer peripheral surface by the laser distance measuring units 12 and 13, the pipe to be measured 7 is displaced in vertical and horizontal directions by using the pipe holding frame and the center line of the pipe to be measured 7, at a position on the second reference outer peripheral surface, coincides with the center line of the first reference ring 5.

At a position on the first reference outer peripheral surface and the second reference outer peripheral surface of the pipe to be measured 7, by making respective center lines to coincide with the first reference ring 5, the center line of the pipe to be measured 7 coincides with the center line which connects the first reference ring 5 with the second reference ring 6. The center line of the pipe to be measured 7 now runs in parallel to the rail 1. The centering of the pipe to be measured 7 is completed.

When the centering of the pipe to be measured 7 is completed, a measurement of inner diameter of the pipe to be measured 7 is started (Step 06).

Because the measuring head 11 is set at the center of the first reference ring 5, the measuring head 11 is positioned at the center of the pipe to be measured 7. Further, even when the pipe to be measured 7 is traveled, the condition, that the measuring head 11 is positioned at the center of the pipe to be measured 7, is not changed because the measuring head 11 is fixed.

The measurement carriage 2 is traveled, the measuring head 11 is inserted into the pipe to be measured 7 and the inner diameter of the pipe to be measured 7 is measured. Further, the measurement carriage 2 is traveled, and the measuring position is changed. Then, the inner diameter measurement is sequentially performed along axial direction of the pipe to be measured 7.

Further, at the time of measurement, the measuring head 11 is supported on the measuring device main unit 8 and is fixed. Vibration caused by the moving of the measurement carriage 2 is not transmitted to the measuring head 11. Standstill condition is maintained and a stable measurement is guaranteed.

In a case where the result of measurement by the measuring head 11 is a relative value from a reference position of the measuring head 11, the relative measurement value is compared with a known value of the inner diameter of the first reference ring 5 measured by the measuring head 11 in advance and the relative measurement value is corrected to an absolute value (Step 07).

Next, in case measurement is performed on another pipe to be measured 7, the pipe to be measured 7 already measured is replaced by a pipe to be measured 7 not yet measured (Step 08).

In this case, merely the centering of the pipe to be measured 7 is carried out because setting on the side of the inner diameter measuring device is already completed. Therefore, preparatory procedure to perform inner diameter measurement in Step 01 to Step 04 is omitted, and the procedure can be extremely simplified.

INDUSTRIAL APPLICABILITY

According to the present invention, an inner diameter measuring device comprises a measurement carriage traveled in straight direction, pipe holding frames disposed at front and rear positions with respect to advancing direction of the measurement carriage and for mounting a pipe to be measured, a measuring head supported at a forward end of a supporting member extended in a direction parallel to advancing direction of the measurement carriage, a first laser distance measuring unit and a second laser distance measuring unit disposed in traveling distance of the measurement carriage and for performing distance measurement in two directions perpendicularly crossing to each other, wherein the pipe holding frames can adjust a supporting position of the pipe to be measured as mounted in horizontal direction and in vertical direction, the measuring head measures an inner diameter of the pipe to be measured on condition that the measuring head is inserted in the pipe to be measured, reference outer peripheral surfaces being formed at least at two parts at front and rear positions on the pipe to be measured, the first laser distance measuring unit and the second laser distance measuring unit measure distance with respect to each of the reference outer peripheral surfaces at the two parts, and the supporting position of the pipe to be measured is adjusted by the pipe holding frames so that results of measurement by the first laser distance measuring unit and the second laser distance measuring unit at the two parts become minimum values. As a result, the centering of the pipe to be measured can be carried out in simple manner, and an inner diameter measurement can be performed over total length of the pipe to be measured by selecting the length of the supporting member.

Further, according to the present invention, an inner diameter measuring method, which is performed by using an inner diameter measuring device which comprise a measurement carriage traveled in straight direction, pipe holding frames disposed at front and rear positions with respect to advancing direction of the measurement carriage and for mounting a pipe to be measured, a measuring head supported at a forward end of a supporting member extended in a direction parallel to advancing direction of the measurement carriage and for measuring an inner diameter of the pipe to be measured, a first laser distance measuring unit and a second laser distance measuring unit disposed in traveling distance of the measurement carriage and for performing distance measurement in two directions perpendicularly crossing each other, comprising a step of mounting the pipe to be measured with reference outer peripheral surfaces being formed at least at two parts at front and rear positions on the pipe holding frame, a step of performing distance measurement with respect to reference outer peripheral surfaces at the two parts by the first laser distance measuring unit and the second laser distance measuring unit, and a step of adjusting a supporting position of the pipe to be measured by the pipe holding frames so that measurement results of the first laser distance measuring unit and the second laser distance measuring unit at the two parts become minimum values. As a result, the centering of the pipe to be measured can be carried out in simple manner.

LEGEND OF REFERENCE NUMERALS

1 Rail
2 Measurement carriage
3 Pipe holding frame
4 Pipe holding frame
5 First reference ring
6 Second reference ring
7 Pipe to be measured
8 Measuring device main unit
11 Measuring head
12 Laser distance measuring unit
13 Laser distance measuring unit

The invention claimed is:

1. An inner diameter measuring device, comprising a measurement carriage traveled in straight direction, pipe holding frames disposed at front and rear positions with respect to advancing direction of said measurement carriage and for mounting a pipe to be measured, a measuring head supported at a forward end of a support extended in a direction parallel to advancing direction of said measurement carriage, a first laser distance measuring detector and a second laser distance measuring detector disposed in traveling distance of said measurement carriage and for performing distance measurement in two directions perpendicularly crossing to each other, wherein said pipe holding frames can adjust a supporting position of said pipe to be measured as mounted in horizontal direction and in vertical direction, said measuring head measures an inner diameter of said pipe to be measured on condition that said measuring head is inserted in said pipe to be measured, reference outer peripheral surfaces being formed at least at two parts at front and rear positions on said pipe to be measured, said first laser distance measuring detector and said second laser distance measuring detector measure distance with respect to each of the reference outer peripheral surfaces at said two parts, and the supporting position of said pipe to be measured is adjusted by said pipe holding frames so that results of measurement by said first laser distance measuring detector and said second laser distance measuring detector at said two parts become minimum values.

2. An inner diameter measuring device according to claim 1, wherein at least one reference ring is provided on said measurement carriage, said reference ring has an outer diameter already known and an inner diameter already known, a positional relation of said reference ring and said measuring head is set so that said measuring head is positioned on a center line of said reference ring, wherein said first laser distance measuring detector and said second laser distance measuring detector measure the outer peripheral surface of said reference ring, and positions of said first laser distance measuring detector and said second laser distance measuring detector are set so that results of distance measurement by said first laser distance measuring detector and by said second laser distance measuring detector become minimum values respectively.

3. An inner diameter measuring device according to claim 2, wherein the inner diameter of said reference ring is measured in advance by said measuring head, and the inner diameter of said pipe to be measured as measured by said measuring head is corrected based on the inner diameter of said reference ring as measured.

4. An inner diameter measuring method, which is performed by using an inner diameter measuring device which comprise a measurement carriage traveled in straight direction, pipe holding frames disposed at front and rear positions with respect to advancing direction of said measurement carriage and for mounting a pipe to be measured, a measuring head supported at a forward end of a support extended in a direction parallel to advancing direction of said measurement carriage and for measuring an inner diameter of said pipe to be measured, a first laser distance measuring detector and a second laser distance measuring detector disposed in traveling distance of said measurement carriage and for performing distance measurement in two directions perpendicularly crossing each other, comprising a step of mounting said pipe to be measured with reference outer peripheral surfaces being formed at least at two parts at front and rear positions on said pipe holding frame, a step of performing distance measurement with respect to said reference outer peripheral surfaces at two parts by said first laser distance measuring detector and said second laser distance measuring detector, and a step of adjusting a supporting position of said pipe to be measured by said pipe holding frames so that measurement results of said first laser distance measuring detector and said second laser distance measuring detector at said two parts become minimum values.

\* \* \* \* \*